United States Patent [19]

Vogelsberger et al.

[11] Patent Number: 5,624,193
[45] Date of Patent: Apr. 29, 1997

[54] BALL OR ROLLER BEARING ASSEMBLY, IN PARTICULAR A BACK BEARING ASSEMBLY FOR A MOTOR VEHICLE ALTERNATOR

[75] Inventors: Marcel Vogelsberger, Wissous; Daniel Davoigneau, Mitry-Mory, both of France

[73] Assignee: Valeo Equipements Electriques Moteur, Creteil, France

[21] Appl. No.: 587,226

[22] Filed: Jan. 16, 1996

[30] Foreign Application Priority Data

Jan. 17, 1995 [FR] France .................. 95 00455

[51] Int. Cl.⁶ .................. F16C 19/08; F16F 1/32
[52] U.S. Cl. .................. 384/517; 267/163
[58] Field of Search .................. 384/493, 517, 384/518, 519, 563; 267/159, 163

[56] References Cited

U.S. PATENT DOCUMENTS

| | | | |
|---|---|---|---|
| 1,923,399 | 8/1933 | Sharp | 384/517 |
| 2,188,251 | 1/1940 | Nelson | 384/517 |
| 3,804,562 | 4/1974 | Hansson | 384/517 X |
| 4,173,376 | 11/1979 | Standing et al. | 384/517 |
| 4,364,615 | 12/1982 | Euler | 384/517 |
| 4,655,616 | 4/1987 | Ducan | 384/446 |
| 5,000,589 | 3/1991 | Ogata et al. | 384/611 |

FOREIGN PATENT DOCUMENTS

| | | |
|---|---|---|
| 1135722 | 5/1957 | France . |
| 2608708 | 6/1988 | France . |
| 471572 | 2/1929 | Germany . |
| 501140 | 6/1930 | Germany . |
| 336653 | 4/1959 | Switzerland . |
| 2147957 | 5/1985 | United Kingdom . |

Primary Examiner—Thomas R. Hannon
Attorney, Agent, or Firm—McCormick, Paulding & Huber

[57] ABSTRACT

A bearing assembly for a rotary shaft machine, the assembly comprising a ball or rotary bearing mounted between a bearing support and the shaft, the bearing comprising an outer ring and an inner ring between which rolling elements are interposed, the outer ring being held rigidly to the support, the inner ring and the shaft being slidable relative to each other, the bearing assembly further comprising at least one washer mounted between the inner ring and a shoulder of the shaft and exerting force between the inner ring and the shoulder tending to move them apart to take up operating slack, wherein the washer presents a flat annulus and a plurality of trapezium-shaped resilient tabs extending radially from the annulus, each presenting a portion that is inclined relative to the plane of the annulus and each being terminated by an end flat parallel to the plane of the annulus.

9 Claims, 3 Drawing Sheets

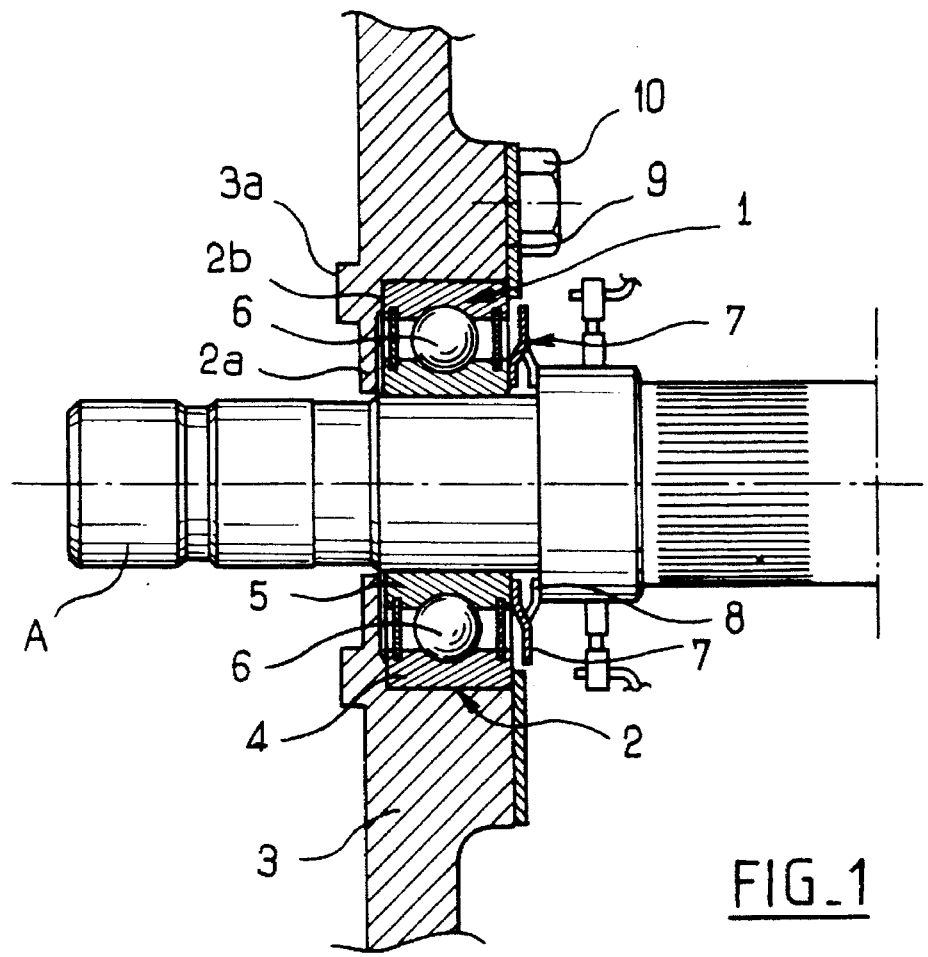
FIG_1
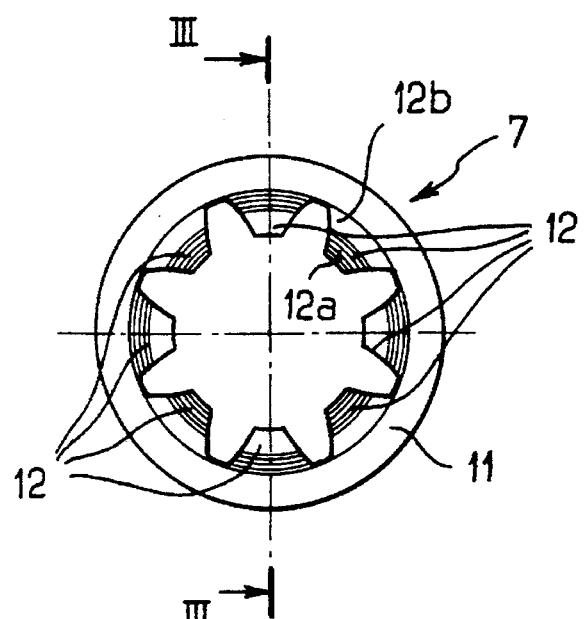
FIG_2
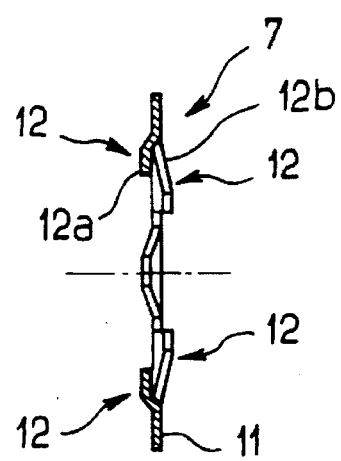
FIG_3

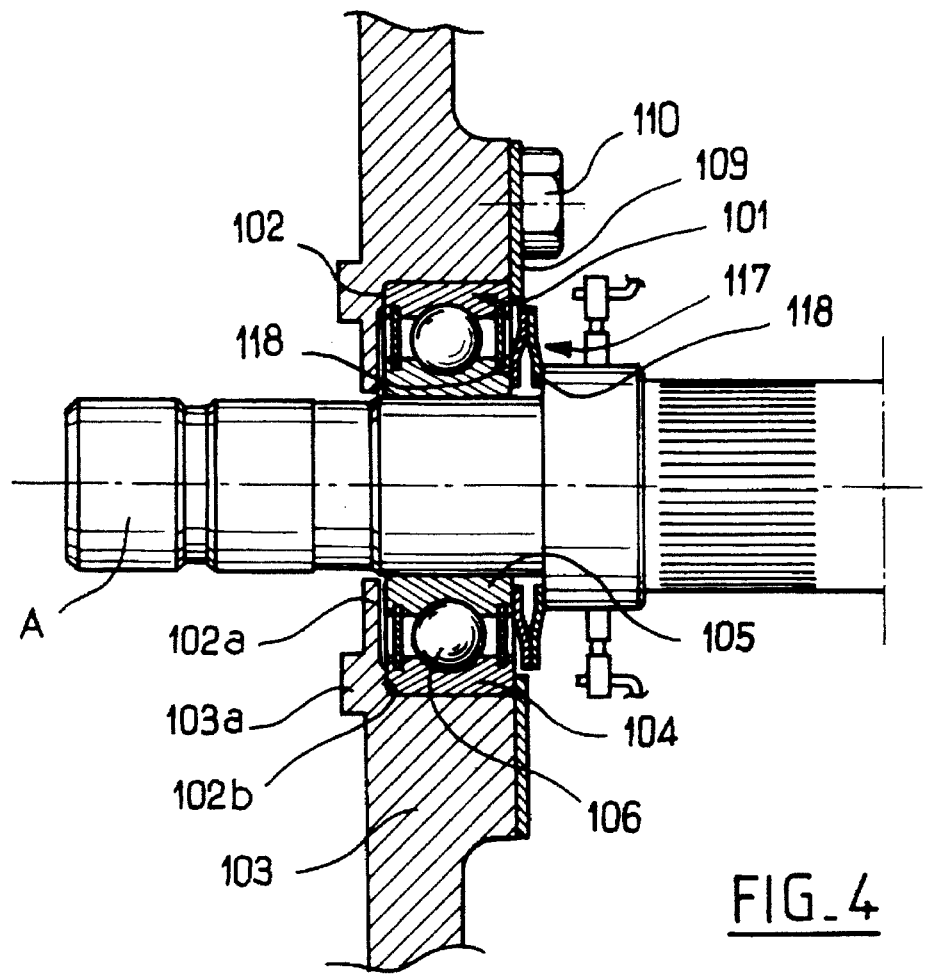
FIG_4
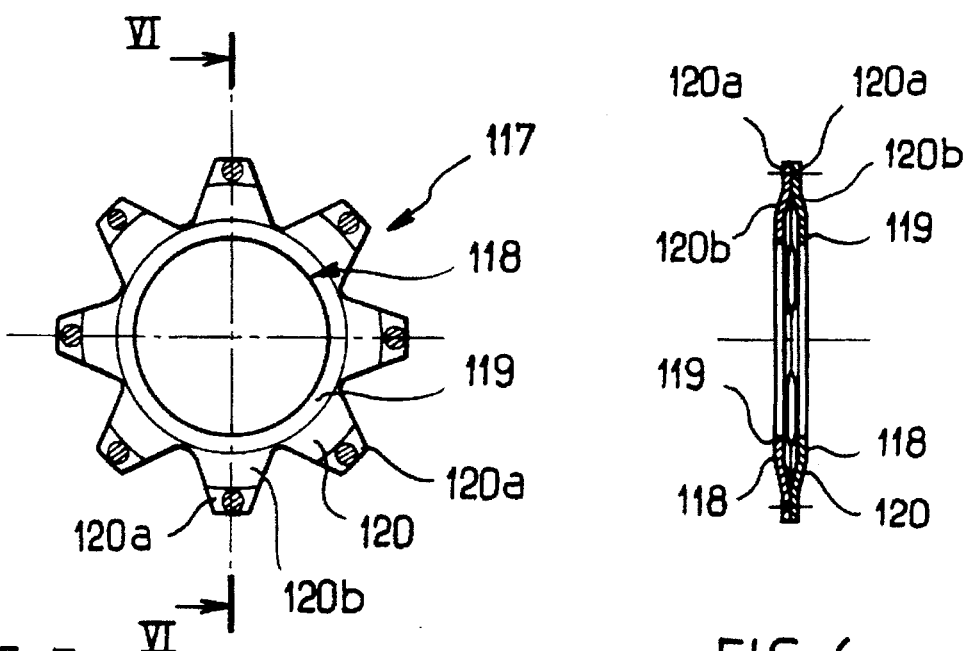
FIG_5  FIG_6

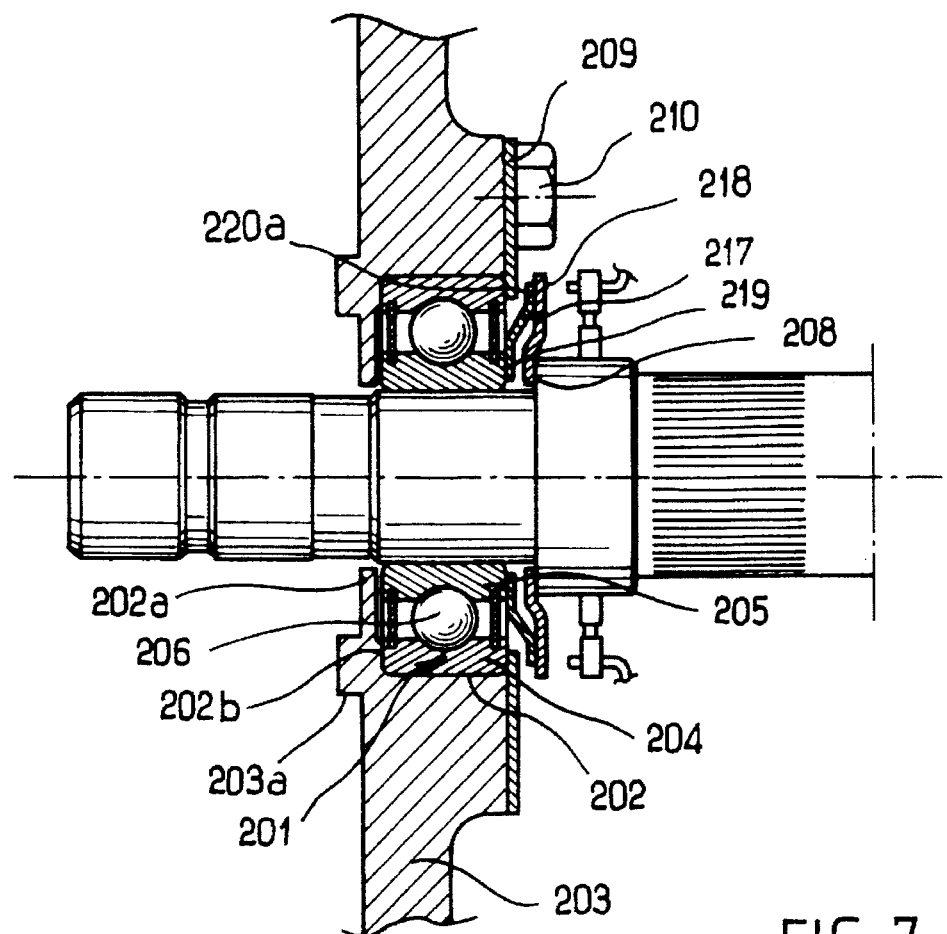
FIG. 7
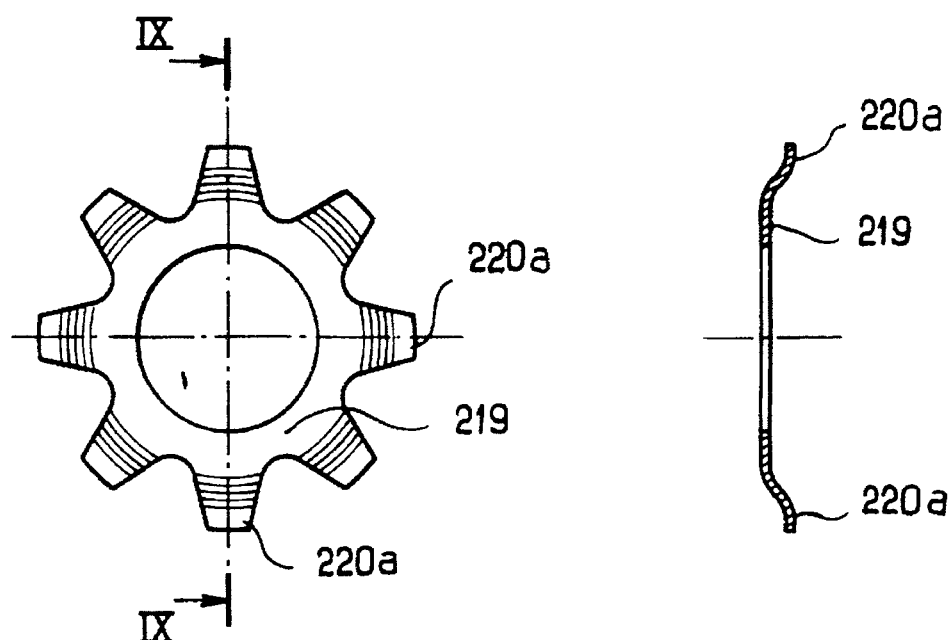
FIG. 8
FIG. 9

BALL OR ROLLER BEARING ASSEMBLY, IN PARTICULAR A BACK BEARING ASSEMBLY FOR A MOTOR VEHICLE ALTERNATOR

The present invention relates to ball or roller bearing assemblies for rotary machines.

BACKGROUND OF THE INVENTION

A particularly advantageous application lies in the back bearing assemblies of alternators for motor vehicles.

Generally, the bearing proper of a bearing assembly is held against a support by means of capsules or washers made of plastic or of additional elements made of steel (e.g. a stop ring). Throughout the present specification, the term "alternator back bearing assembly" is used to mean the bearing assembly situated on an alternator at its end remote from the drive thereto.

Various solutions attempt to reconcile operating stiffness (axial support for the shaft) and ease of installation.

Nevertheless, the slack necessary during assembly and for operation without applying stress on the bearing is itself damaging and can lead to several types of defect under the effect of vibration at high speed.

In particular, the outer ring of the bearing can be subjected to rotation that causes the bearing assembly to be destroyed.

Also, axial slack in the bearing and vibration at high speed can cause the rolling paths on the rings to be destroyed.

The vibration and hammering due to such slack can also give rise to premature wear of the bearing and its housing in the bearing support.

Document FR-A-1 135 722 describes a bearing assembly for a rotary shaft machine, which assembly includes a ball or roller bearing mounted between a support and the shaft. The outer ring of the bearing is rigidly fixed to the support while the inner ring is capable of sliding relative to the shaft. A column made up of two plate-springs is interposed between the inner ring and a shoulder on the shaft for the purpose of exerting a force tending to move them apart so as to take up the operating axial slack. Nevertheless, plate-springs are very stiff in that they exhibit significant resilience only when subjected to high stresses. As a result, the axial slack is taken up only at the price of applying large axial stresses on the parts, and that is harmful to good operation of the bearing assembly.

OBJECTS AND SUMMARY OF THE INVENTION

An object of the invention is thus to propose a ball or roller bearing for a rotary machine and making the following possible:

high quality centering;
no backlash, i.e. no slack in operation, but without excessive axial stresses between the parts;
no rotation of the outer ring;
cancellation of stresses due to assembly or to thermal expansion; and
satisfactory cooling of the bearing.

To this end, the invention provides a bearing assembly for a rotary shaft machine, the assembly comprising a ball or rotary bearing mounted between a bearing support and the shaft, the bearing comprising an outer ring and an inner ring between which rolling elements are interposed, the outer ring being held rigidly to the support, the inner ring and the shaft being slidable relative to each other, the assembly further comprising at least one washer mounted between the inner ring and a shoulder of the shaft and exerting force between the inner ring and the shoulder tending to move them apart to take up operating slack, wherein the washer presents a flat annulus and a plurality of substantially trapezium-shaped resilient tabs extending radially from the annulus, each presenting a portion that is inclined relative to the plane of the annulus and each being terminated by an end flat parallel to the plane of the annulus. The tabs are referred to as "substantially trapezium shaped" in view of the fact that both radially displaced parralel inner and outer edges and non-parrallel side edges may be viewed as slightly arcuate rather than perfectly linear. The word "trapezium" is meant to describe "a quadrilateral plane figure having two parallel and two non-parallel sides".

Under the effect of axial stresses, the radial tabs deform resiliently independently of one another. The washer having radial tabs is thus less stiff than a plate-spring of comparable dimensions. The washer thus makes it possible to apply a resilient force for taking up the axial slack between the parts without applying excessive axial stress thereon.

According to advantageous other characteristics of the invention, which may be used on their own or in any technically feasible combinations:

the washer has an outer annulus and a plurality of resilient tabs extending towards the inside of said washer from said annulus, said tabs lying alternately on one side and on the other side of the main plane of said annulus, said tabs on one side of the plane of the annulus pressing against the inner ring of the bearing and the tabs on the other side thereof pressing against the shoulder;

the bearing assembly includes two superposed washers each comprising an inner annulus and a plurality of resilient tabs extending outwards from said annulus, the resilient tabs of the two washers meeting at their ends and holding the two inner annuluses spaced apart from each other, one of the annuluses pressing against the shoulder, while the other annulus presses against the inner ring of the bearing;

the bearing assembly includes a rigid annular washer in abutment against the shoulder of the shaft, and a resilient washer having an inner annulus whereby it presses against the inner ring of the bearing, and a plurality of resilient tabs which extend from said inner annulus and which press against the rigid washer;

the outer ring is fixed in the housing of the support which receives the bearing by being clamped against the end wall of said housing;

a plate is applied against the face of the support remote from said end wall by means of screws;

the outer ring of the bearing is crimped in the support housing that receives the bearing; and the end wall of the housing has an annular thrust surface projecting into the inside of the housing and against which the outer ring of the bearing presses.

The invention also provides such an alternator back bearing assembly, in particular for a motor vehicle, and also an alternator including such a bearing assembly.

Other characteristics and advantages of the invention appear further from the following description.

BRIEF DESCRIPTION OF THE DRAWINGS

The description is purely illustrative and non-limiting. It should be read with reference to the accompanying drawings, in which:

FIG. 1 is a partially cutaway axial section view of an alternator back bearing assembly constituting a first embodiment of the invention;

FIG. 2 is a front view of the resilient washer of the assembly shown in FIG. 1;

FIG. 3 is a section view on line III—III of FIG. 2;

FIGS. 4 to 6 are similar to FIGS. 1 to 3 but show a bearing assembly constituting another possible embodiment of the invention; and FIGS. 7 to 9 are similar to FIGS. 1 to 3, but show a bearing assembly constituting yet another possible embodiment of the invention.

MORE DETAILED DESCRIPTION

The alternator back bearing assembly shown in FIG. 1 comprises a ball or roller bearing 1 mounted in a housing 2 formed in an end plate 3 of an alternator. The bearing assembly allows the alternator shaft, referenced A, to rotate.

The bearing 1 has an outer ring 4 rigidly mounted in the housing 2, and an inner ring 5 slidably mounted on the shaft A. In this case, the rolling elements are balls 6 mounted between running paths provided in the two rings 4 and 5.

The housing 2 that receives the bearing 1 has an internal outline that is cylindrical with a diameter corresponding to the outside diameter of the ring 4.

This housing 2 is closed by an end wall 2a on its side adjacent to the outside face of the end plate 3.

The end wall 2a has an annular thrust surface 2b which projects into the housing 2 and against which the outer ring 4 presses. The inside diameter of the annular thrust surface 2b is slightly greater than the inside diameter of the outer ring 4, thereby leaving slack between the inner ring 5 and the end wall 2a.

The outer ring 4 is held in place by being clamped inside the housing 2 by means of an annular plate 9 which is applied against the inside face of the end plate 3 and which is fixed to said end plate 3 by a plurality of screws 10. The inside diameter of the annular plate 9 is slightly smaller than the outside diameter of the outer ring 4 of the bearing so that the annular plate 9 extends part of the way over the edge of the outer ring 4. Tightening is performed in such a manner as to clamp the ring 4 against the annular bearing surface 2b.

The outside face of the end plate 3 level with the thrust surface 2b has an annular stiffening rib 3a. The outside diameter of the rib 3a is greater than the inside diameter of the housing 2.

The bearing assembly further includes a resilient washer 7 fitted on the shaft A inside the alternator. The washer 7 is mounted in the axial direction so as to be located between an annular shoulder 8 on the shaft A and the inner ring 5 of the bearing 1. The washer 7 is resiliently compressed between the shoulder 8 and the inner ring 5. It urges said inner ring 5 axially towards the end wall 2a so that all of the operating slack is taken up.

The shoulder 8 extends inside the case of the alternator beyond the inside face of the end plate 3.

With the above-described structure, the outer ring 4 of the bearing 1 is rigidly secured to the bearing support as constituted by the end plate 3. The inner ring 5 and the shaft A can slide axially relative to each other in both directions. The operating slack is taken up by the force exerted by the washer 7 between said ring 5 and the shoulder 8.

Naturally, the resilient washer 7 in a bearing assembly of the invention may have different configurations.

The resilient washer 7 as shown in FIGS. 1 to 3 is a part made of metal or plastics material comprising a flat outer annulus 11 and a plurality of trapezium-shaped resilient tabs 12 extending radially from said outer annulus 11 towards the inside of said washer 7.

The large bases of the resilient tabs 12 are situated at the flat outer annulus 11. Each of these tabs 12 is terminated at its small base by a flat 12a for applying thrust parallel to the plane of the flat annulus. Each flat 12a is connected to the flat annulus 11 via a resilient portion 12b, with the resilient portions 12b being inclined alternately to one side and to the other side of the plane of the flat annulus 11 around the periphery of the washer 7.

Alternate flats 12a thus bear against a plane edge of the inner ring 5 and against the shoulder 8. They thus serve to apply prestress to the bearing 1 and the shaft A by implementing surface-against-surface contacts therewith. The inside diameter defined by the flats 12a for a given resilient washer 7 varies as a function of the extent to which the washer is compressed.

It may be observed that the number of resilient tabs 12 is advantageously selected to be even (e.g. 8, 10, or 12).

This embodiment includes a single washer only. It is particularly cheap to manufacture and to assemble.

In the variant embodiment shown in FIGS. 4 to 6, elements corresponding to those of the embodiment shown in FIGS. 1 to 3 are given the same reference numerals plus 100.

The bearing assembly of FIGS. 4 to 6 includes, in particular, a ball or roller bearing 101 received in a housing 102 of an end plate 103. The bearing 101 is constituted by an outer ring 104, an inner ring 105, and in this case balls 106.

An annular resilient element 117 is resiliently interposed between the inner ring 105 and a shoulder 108 on the shaft A of the alternator.

The resilient element or washer 117 is made up of two members 118. Each of these two members 118 has a flat inner annulus 119 and a plurality of substantially trapezium-shaped resilient tabs 120 extending radially outwardly from said inner annulus 119.

Each of these tabs 120 has a resilient portion 120b that is inclined relative to the plane of the ring, connecting the flat annulus 119 to an end flat 120a (parallel to the plane of the flat annulus) terminating each of the tabs at its small base. The flats 120a of the two washers 118 press against each other in pairs and they are secured together, e.g. by electrical welding. The two annuluses 119 are spaced apart from each other by the resilient portions 120b.

When the resilient element 117 is in place in the bearing assembly, the two annuluses 119 are elastically pressed towards each other, one being in contact with the shoulder 108 while the other is in contact with the inner ring 105 of the bearing 101. The inside diameter of these rings remains constant.

The number and the dimensions of the spring blades defined by the tabs 120 are adjusted together with the thickness of the members 118 as a function of the desired force and stroke.

This one-piece resilient part makes assembly particularly simple to perform.

In the variant shown in FIGS. 7 to 9, elements corresponding to the embodiment of FIGS. 1 to 3 are given the same reference numerals plus 200.

The bearing assembly of FIGS. 7 to 9 comprises, in particular, a ball or roller bearing 201 received in a housing 202 of an end plate 203. This bearing 201 comprises an outer ring 204, an inner ring 205, and in this case balls 206.

An annular resilient element 217 urges the inner ring 205 resiliently towards the end of the housing 202. This element 217 is a resilient washer analogous to the washers 118 of the variant embodiment of FIGS. 4 to 6. Its inner annulus given reference 219 presses against the edge of the inner ring 205. Its end flats, referenced 220a, press against a rigid metal washer retainer 218 which is itself in abutment against a shoulder 208 of the alternator shaft A.

Naturally, other variant embodiments are also possible. In particular, the outer ring of the bearing may likewise be held in the housing of the end plate by crimping.

The structures of the invention as described above present numerous advantages.

The axial slack between the shaft and the bearing makes it possible to accommodate differential expansion between the shaft A and its bearing assembly; once the bearing has been put into place on the end plate, the slack also serves to make it possible to install the bearing assembly on the shaft without applying additional stress to the bearing.

The slack presented by the bearing relative to its support (end plate) is small so the axial displacement of the rotor is limited. In the particular case of a back bearing assembly, such displacement under vibration conditions could give rise to the front bearing being destroyed by spalling.

Also, with this bearing assembly, the operating temperature of the bearing is kept down, thereby facilitating good lubrication.

Since the outer ring of the bearing is rigidly fixed, it does not rotate in the presence of vibration. This prevents the walls of the housing in which the bearing is received from becoming worn.

Accurate concentricity between the housing and the bearing makes it possible to avoid magnetic noise as is generated in a prior art bearing assembly by the rotor being off-center.

In addition, the solution proposed by the invention is compact both axially and radially. Its cost is low.

The washer exerts (or the washers exert, depending on the embodiment) a force on the inner ring and on the shoulder tending to urge them elastically apart, thereby taking up the slack without excessive axial stress being applied to the parts.

It is advantageous for the thrust from the washer(s) to be exerted on a shoulder of the shaft rather than on an additional part rigidly secured to the shaft. If an additional part is secured to the shaft, then manufacture is made more complicated and assembly is made more difficult.

We claim:

1. A bearing assembly for a rotary shaft machine, the assembly comprising a ball or rotary bearing mounted between a bearing support and the shaft, the bearing comprising an outer ring and an inner ring between which rolling elements are interposed, the outer ring being held rigidly to the support, the inner ring and the shaft being slidable relative to each other, the bearing assembly further comprising at least one washer mounted between the inner ring and a shoulder of the shaft and exerting force between the inner ring and the shoulder tending to move them apart to take up operating slack, wherein the washer presents a flat annulus and a plurality of substantially trapezium-shaped resilient tabs extending radially from the annulus, each presenting a portion that is inclined relative to the plane of the annulus and each being terminated by an end flat parallel to the plane of the annulus.

2. A bearing assembly according to claim 1, wherein the washer has an outer annulus and a plurality of resilient tabs extending towards the inside of said washer from said annulus, said tabs lying alternately on one side and on the other side of the main plane of said annulus, said tabs on one side of the plane of the annulus pressing against the inner ring of the bearing and the tabs on the other side thereof pressing against the shoulder.

3. A bearing assembly according to claim 1 wherein the washer comprises two superposed members each comprising an inner annulus and a plurality of resilient tabs extending outwardly from said annulus, the resilient tabs of the two members meeting at their ends and holding the two inner annuluses spaced apart from each other, one of the annuluses pressing against the shoulder while the other presses against the inner ring of the bearing.

4. A bearing assembly according to claim 1 including a rigid annular washer retainer in abutment against the shoulder of the shaft, and a resilient washer having an inner annulus whereby it presses against the inner ring of the bearing, and a plurality of resilient tabs which extend from said inner annulus and which press against the rigid washer.

5. A bearing assembly according to claim 1, wherein the outer ring is fixed in the housing of the support which receives the bearing by being clamped against the end wall of said housing.

6. A bearing assembly according to claim 5, wherein a plate is applied against the face of the support remote from said end wall by means of screws.

7. A bearing assembly according to claim 5, wherein the end wall of the housing has an annular thrust surface projecting into the inside of the housing and against which the outer ring of the bearing presses.

8. An alternator back bearing assembly for a motor vehicle, according to claim 1.

9. An alternator, for a motor vehicle, according to claim 8.

* * * * *